United States Patent
Spencer

(10) Patent No.: US 6,945,478 B2
(45) Date of Patent: Sep. 20, 2005

(54) FUEL INJECTOR HAVING AN ORIFICE PLATE WITH OFFSET COINING ANGLED ORIFICES

(75) Inventor: Dale Stewart Spencer, Newport News, VA (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 251 days.

(21) Appl. No.: 10/097,628

(22) Filed: Mar. 15, 2002

(65) Prior Publication Data

US 2003/0173430 A1 Sep. 18, 2003

(51) Int. Cl.$^7$ ............................. B05B 1/30; F02M 59/00; F02M 39/00
(52) U.S. Cl. ................................. 239/585.1; 239/585.3; 239/585.5; 239/533.2; 239/533.3; 239/533.13; 239/533.14
(58) Field of Search ........................... 239/585.1, 585.2, 239/585.3, 585.4, 585.5, 533.2, 533.3, 533.9, 533.13, 533.14, 88–92, 95; 251/129.15, 129.21, 127

(56) References Cited

U.S. PATENT DOCUMENTS

| | | | |
|---|---|---|---|
| 1,785,071 A | 12/1930 | Coberly | |
| 2,737,831 A | 3/1956 | Webb et al. | 76/107 |
| 2,843,927 A | 7/1958 | Stock | 29/545 |
| 3,434,327 A | 3/1969 | Speakman | 72/377 |
| 4,545,231 A | 10/1985 | Connolly et al. | 72/335 |
| 4,699,323 A | * 10/1987 | Rush et al. | 239/544 |
| 4,987,761 A | 1/1991 | Saccoccio | 72/335 |
| 5,109,823 A | 5/1992 | Yokoyama et al. | 123/472 |
| 5,239,751 A | 8/1993 | Kanamaru et al. | |
| 5,244,154 A | * 9/1993 | Buchholz et al. | 239/590.3 |
| 5,263,353 A | 11/1993 | Bakermans et al. | 72/334 |
| 5,626,295 A | 5/1997 | Heyse et al. | 239/596 |
| 5,716,009 A | 2/1998 | Ogihara et al. | |
| 5,992,502 A | 11/1999 | Blaimschein et al. | 164/476 |
| 6,018,976 A | 2/2000 | Wolf | 72/327 |
| 6,190,214 B1 | 2/2001 | Bianca et al. | 439/751 |
| 6,209,381 B1 | 4/2001 | Yaguchi et al. | 72/416 |
| 6,678,955 B2 * | 1/2004 | Takeshita et al. | 29/890.142 |
| 2001/0017325 A1 | 8/2001 | Harata et al. | |
| 2002/0038825 A1 | 4/2002 | Takeshita et al. | |

FOREIGN PATENT DOCUMENTS

| | | |
|---|---|---|
| EP | 0498931 A1 | 8/1992 |
| FR | 2308440 | 11/1976 |
| RU | 1278065 | 12/1986 |

OTHER PUBLICATIONS

European Search Report, Application No. EP 03 25 1498, date of completion, Aug. 22, 2003.

* cited by examiner

*Primary Examiner*—Davis Hwu

(57) ABSTRACT

A fuel injector having an orifice plate proximate the outlet. The orifice plate has first and second plate surfaces spaced at a predetermined distance from one another and an orifice, the orifice extending along a longitudinal axis and includes a first surface and a second surface being spaced from the first surface. The first surface includes a first region having a first surface characteristic being oriented in a first direction oblique to the longitudinal axis. The second surface includes a second region having second surface characteristic being oriented in a second direction oblique to longitudinal axis. The fuel injector has a housing extending a longitudinal axis. The housing includes an inlet, an outlet and a passageway disposed between the inlet and the outlet. The fuel injector further includes an electromagnetic actuator proximate the inlet, the electromagnetic actuator including an armature and an electromagnetic coil, a valve assembly, the valve assembly including a closure member and a valve seat, the closure member operable to occlude fuel flow to the outlet in a first position and operable to permit fuel flow to the orifice plate in a second position.

45 Claims, 6 Drawing Sheets

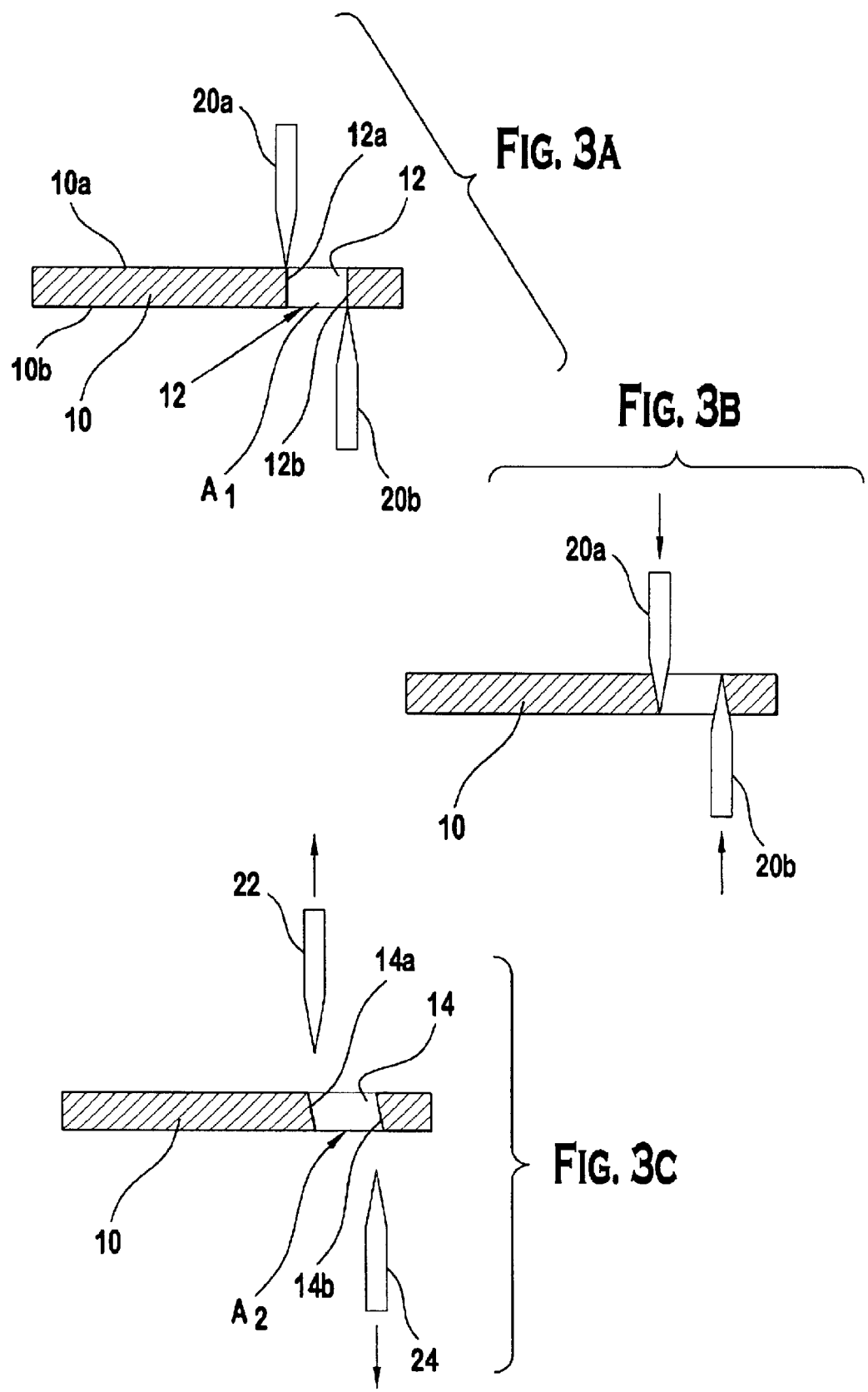

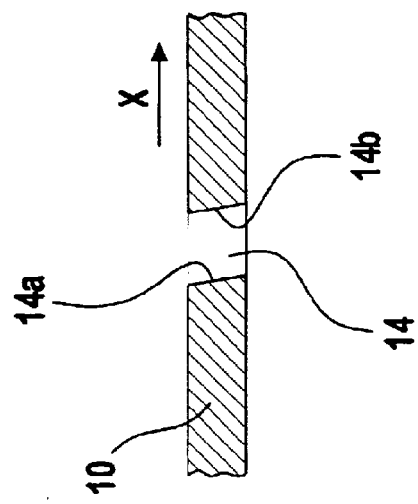
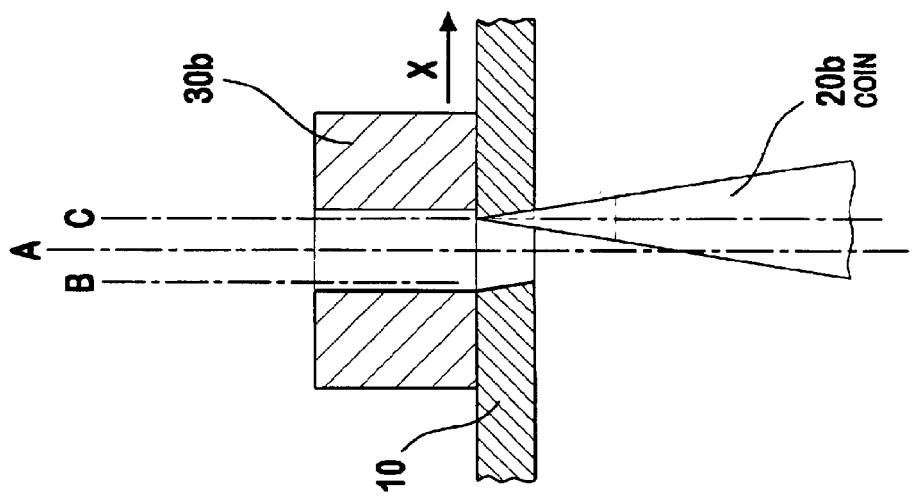
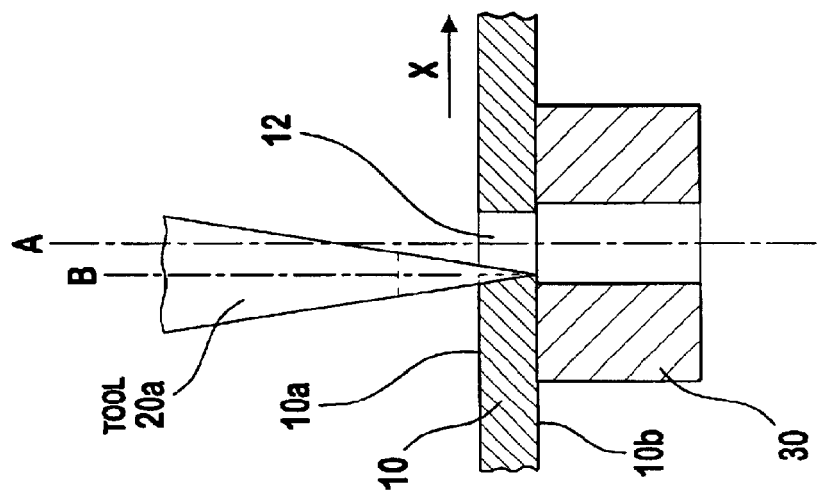

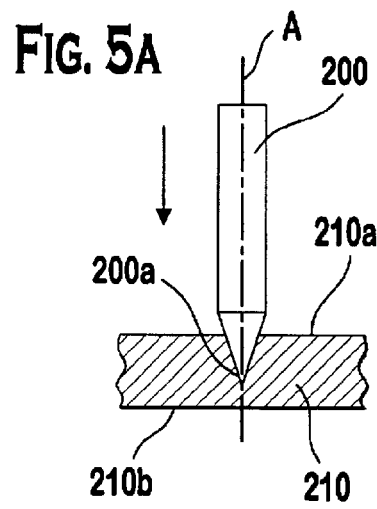
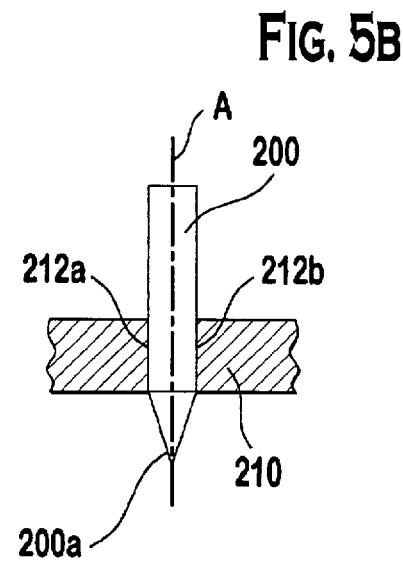
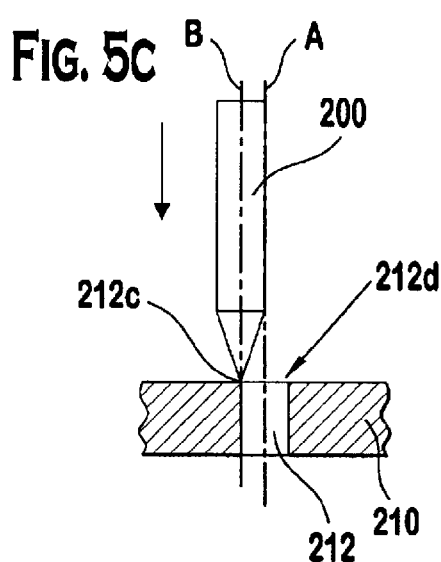
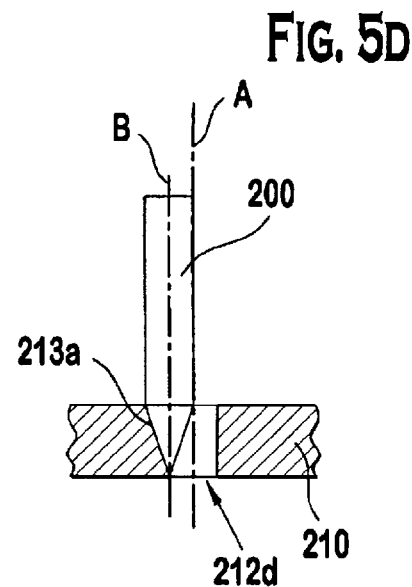
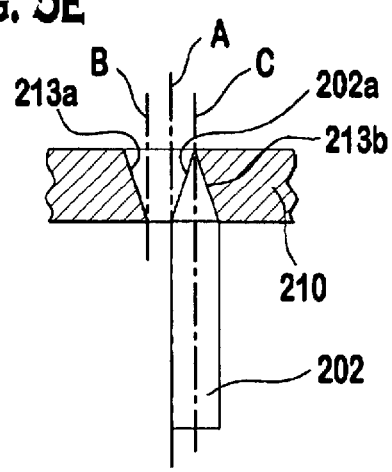
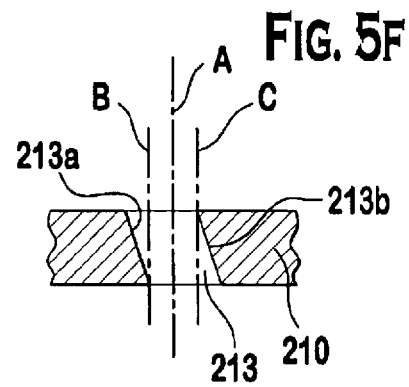

FUEL INJECTOR HAVING AN ORIFICE PLATE WITH OFFSET COINING ANGLED ORIFICES

BACKGROUND OF THE INVENTION

Most modem automotive fuel systems utilize fuel injectors to provide precise metering of fuel for introduction into each combustion chamber. Additionally, the fuel injector atomizes the fuel during injection, breaking the fuel into a large number of very small particles, increasing the surface area of the fuel being injected, and allowing the oxidizer, typically ambient air, to more thoroughly mix with the fuel prior to combustion. The precise metering and atomization of the fuel reduces combustion emissions and increases the fuel efficiency of the engine.

An electromagnetic fuel injector typically utilizes a solenoid assembly to supply an actuating force to a fuel-metering valve. Typically, the fuel metering valve is a plunger-style needle valve which reciprocates between a closed position, where the needle is seated in a valve seat to prevent fuel from escaping through a metering orifice into the combustion chamber, and an open position, where the needle is lifted from the valve seat, allowing fuel to discharge through the metering orifice for introduction into the combustion chamber.

Fuel flowing through a fuel injector typically exits at an outlet end of the fuel injector. The outlet end typically have a disk or plate with at least one orifice to control, in part, the spray pattern and the direction of the fuel exiting the fuel injector.

An orifice extending along an axis perpendicular to a surface of a work piece (i.e. a straight orifice) is believed to be formed by drilling or by punching through the work piece. One method of drilling is by electric discharge machining (EDM) that can form orifices of 150 to 200 microns in diameter. It is believed that one of the many disadvantages of EDM is the fact that the holes are typically formed without any favorable entry or exit geometry for the orifices, thereby affecting the flow through the orifices. Another method is by laser machining the orifices on the work piece or the plate. Yet another method can be by stamping or punching the orifices and then coining each edge of the orifice. However, it is believed that the orifices formed by these methods do not allow for spray targeting of the fuel as the fuel leaves the orifices of the injector.

In order to target the fuel spray, it is believed that orifices can be angled to a desired angle relative to a longitudinal axis of the fuel injector. Such angled orifices can be formed by any of the above methods, albeit at, it is believed, a much greater cost than a straight orifice. Another method utilizes dimpling a portion of the work piece on which a straight orifice has already been formed with a right circular cone. However, it is believed that such dimpled orifice plate increases a sac volume between the fuel injector closure tip and the orifice plate. This increased sac volume, during a non-injection event, causes fuel to remain in the sac that vaporizes and causes rich/lean shifts and hot start issues, which are undesirable.

SUMMARY OF THE INVENTION

Briefly, the present invention provides a plurality of angled orifices on a work piece and a method of forming such angled orifices. The present invention also provides for a fuel injector. The fuel injector has a housing extending along a longitudinal axis, the housing including an inlet, an outlet and a passageway disposed between the inlet and the outlet. The fuel injector includes an electromagnetic actuator proximate the inlet and an orifice plate proximate the outlet. The electromagnetic actuator having an armature, an electromagnetic coil a closure member and a valve seat. The closure member is operable to occlude fuel flow to the outlet in a first position and is operable to permit fuel flow to the outlet in a second position. The orifice plate is located proximate the outlet, the orifice plate having first and second plate surfaces spaced at a predetermined distance along a longitudinal axis and an orifice. The orifice includes a first surface and a second surface being spaced from the first surface. The first surface includes a first region having a first surface characteristic being oriented in a first direction oblique to the longitudinal axis. The second surface includes a second region having second surface characteristic being oriented in a second direction oblique to longitudinal axis.

The present invention also provides for a valve assembly for controlling fluid flow. The valve assembly comprises a body having a first end and a second end, an actuator disposed in the body, a closure member operable by the actuator to occlude fluid flow in one position and operable to permit flow in another position, a surface contiguous to the closure member in the one position so as to form a sealing surface, and an orifice plate proximate one of the first and second ends. The orifice plate includes first and second plate surfaces spaced at a predetermined distance from one another along a longitudinal axis, and an orifice. The orifice including a first orifice surface and a second orifice surface being spaced from the first orifice surface. The first orifice surface has a first region including a first surface characteristic being oriented in a first direction oblique to the longitudinal axis. The second orifice surface has a second region including a second surface characteristic being oriented in a second direction oblique to longitudinal axis.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

FIGS. 3a–3c illustrates the formation of an angled orifice in an orifice plate according to another preferred embodiment.

FIGS. 4a–4c illustrate the formation of an angled orifice in an orifice plate according to yet another preferred embodiment.

FIGS. 5a–5f illustrate the formation of an angled orifice in an orifice plate according to yet a further embodiment.

DETAILED DESCRIPTION OF THE PREFERRED EMBODIMENTS

Figure 1:
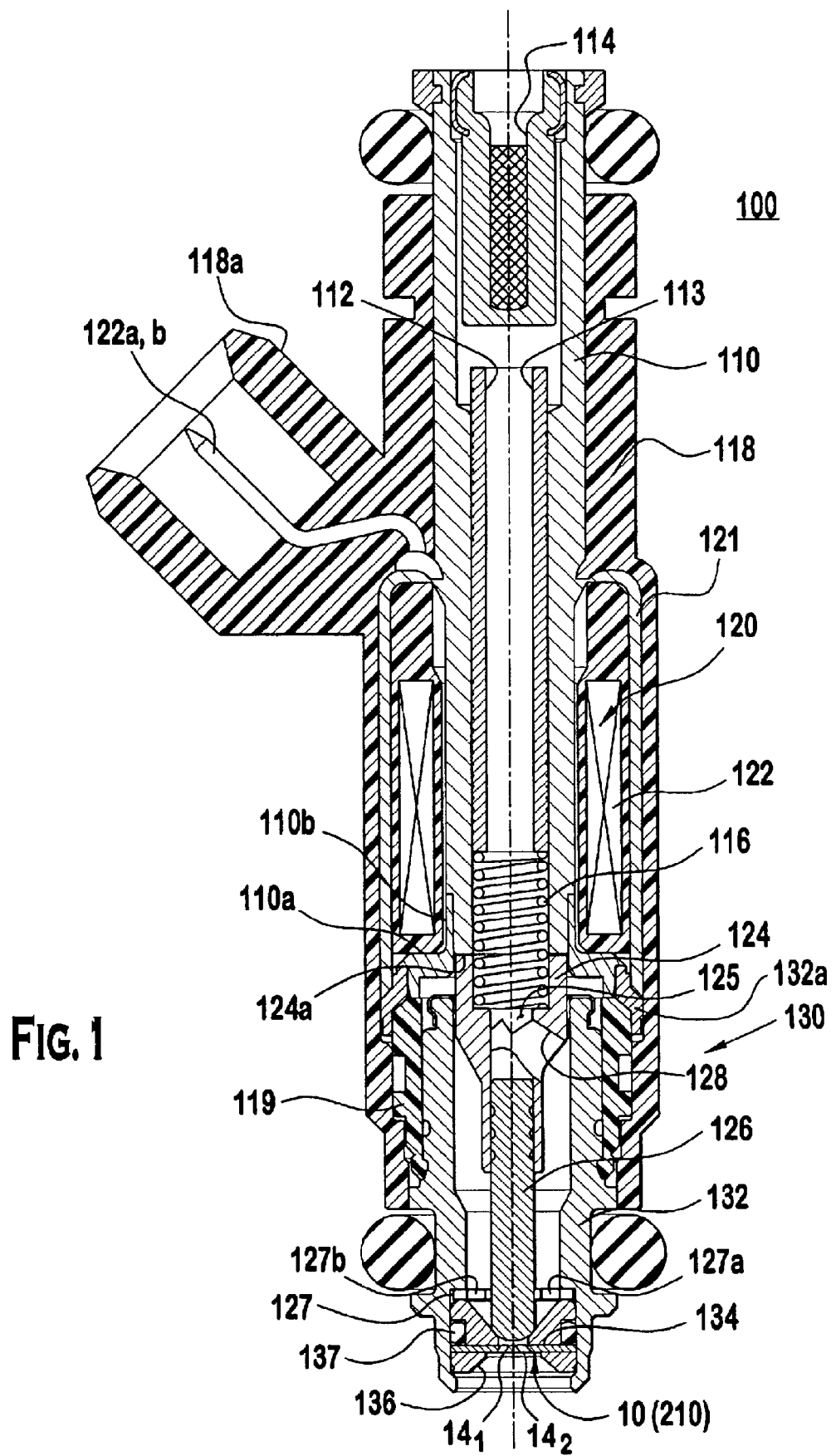
FIG. 1 illustrates a fuel injector with an orifice of a preferred embodiment.

FIGS. 1–5 illustrate the preferred embodiments. In particular, a fuel injector 100 having a preferred embodiment of the orifice plate 10 is illustrated in FIG. 1. The fuel injector 100 includes a fuel inlet tube 110, an adjustment tube 112, a filter assembly 114, a coil assembly 118, a coil spring 116, an armature 124, a closure member 126, a non-magnetic shell 110a, a first overmold 118, a valve body 132, a valve body shell 132a, a second overmold 119, a coil assembly housing 121, a guide member 127 for the closure member 126, a valve seat 134, an orifice plate 10, a backup retainer member 136, and an O-ring seal 137.

The guide member 127, the valve seat 134, the orifice plate 10, the backup retainer member 136, and the small O-ring seal 137 form a stack that is disposed at the outlet end of fuel injector 100, as shown in a number of commonly assigned patents, such as U.S. Pat. No. 5,174,505. Armature 124 and the closure member 126 are joined together to form an armature/needle valve assembly. It should be noted that one skilled in the art could form the assembly from a single component. Coil assembly 120 comprises a plastic bobbin on which an electromagnetic coil 122 is wound.

Respective terminations of coil 122 connect to respective terminals 122a, 122b that are shaped and, in cooperation with a surround 118a formed as an integral part of overmold 118, to form an electrical connector for connecting the fuel injector to an electronic control circuit (not shown) that operates the fuel injector.

Fuel inlet tube 110 can be ferromagnetic and comprises a fuel inlet opening at the exposed upper end. Filter assembly 114 can be fitted proximate to the open upper end of adjustment tube 112 to filter any particulate material larger than a certain size from fuel entering through inlet opening before the fuel enters adjustment tube 112.

In the calibrated fuel injector, adjustment tube 112 has been positioned axially to an axial location within fuel inlet tube 110 that compresses preload spring 116 to a desired bias force that urges the armature/needle valve such that the rounded tip end of closure member 126 can be seated on valve seat 134 to close the central hole through the valve seat. Preferably, tubes 110 and 112 are crimped together to maintain their relative axial positioning after adjustment calibration has been performed.

After passing through adjustment tube 112, fuel enters a volume that is cooperatively defined by confronting ends of inlet tube 110 and armature 124 and that contains preload spring 116. Armature 124 comprises a passageway 128 that communicates volume 125 with a passageway 113 in valve body 130, and guide member 127 contains fuel passage holes 127a, 127b. This allows fuel to flow from volume 125 through passageways 113, 128 to valve seat 134.

Non-ferromagnetic shell 110a can be telescopically fitted on and joined to the lower end of inlet tube 110, as by a hermetic laser weld. Shell 110a has a tubular neck that telescopes over a tubular neck at the lower end of fuel inlet tube 110. Shell 110a also has a shoulder that extends radially outwardly from neck. Valve body shell 132a can be ferromagnetic and can be joined in fluid-tight manner to non-ferromagnetic shell 110a, preferably also by a hermetic laser weld.

The upper end of valve body 130 fits closely inside the lower end of valve body shell 132a and these two parts are joined together in fluid-tight manner, preferably by laser welding. Armature 124 can be guided by the inside wall of valve body 130 for axial reciprocation. Further axial guidance of the armature/needle valve assembly can be provided by a central guide hole in member 127 through which closure member 126 passes.

In the closed position shown in FIG. 1, a working gap exists between the annular end face 110b of fuel inlet tube 110 and the confronting annular end face 124a of armature 124. Coil housing 121 and tube 12 are in contact at 74 and constitute a stator structure that is associated with coil assembly 18. Non-ferromagnetic shell 110a assures that when electromagnetic coil 122 is energized, the magnetic flux will follow a path that includes armature 124. Starting at the lower axial end of housing 34, where it is joined with valve body shell 132a by a hermetic laser weld, the magnetic circuit extends through valve body shell 132a, valve body 130 and eyelet to armature 124, and from armature 124 across working gap 72 to inlet tube 110, and back to housing 121. When electromagnetic coil 122 is energized, the spring force on armature 124 can be overcome and the armature is attracted toward inlet tube 110 reducing working gap 72. This unseats closure member 126 from valve seat 134 open the fuel injector so that pressurized fuel in the valve body 132 flows through the valve seat orifice and through angled orifices $14_1$ and 142 formed on the orifice plate 10. It should be noted here that the actuator may be mounted such that a portion of the actuator can disposed in the fuel injector and a portion can be disposed outside the fuel injector.

When the coil ceases to be energized, preload spring 116 pushes the armature/needle valve closed on valve seat 134. Further operations of the fuel injector are set forth in U.S. Pat. No. 5,494,225 issued on Feb. 27, 1996, which is incorporated in its entirety herein by reference.

Figure 2A:
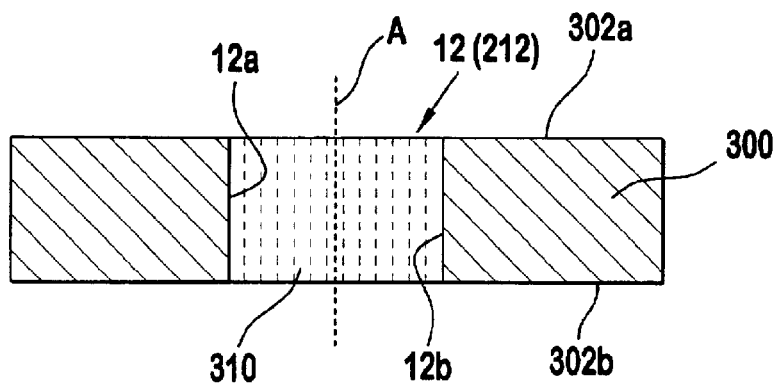
FIGS. 2a–2e illustrate the characteristics of an orifice and orifice plate in FIG. 1 prior to the formation of the angled orifice and after the formation of the slanted orifice.
Figure 2B:
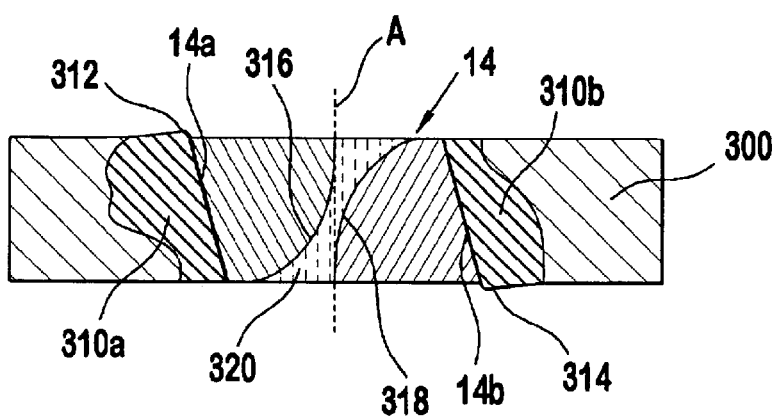
Figure 2C:
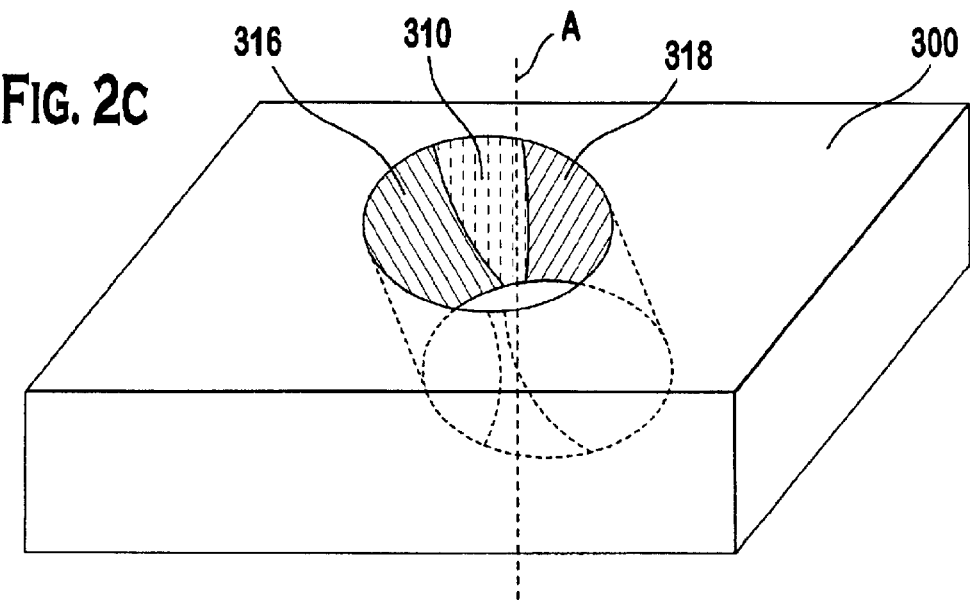
Figure 2D:
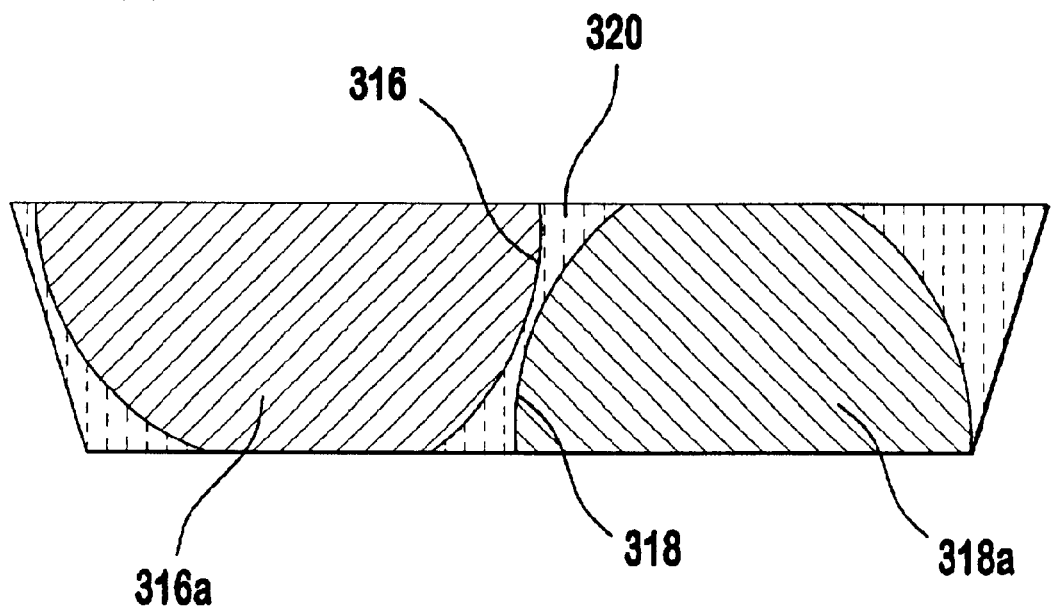
Figure 2E:
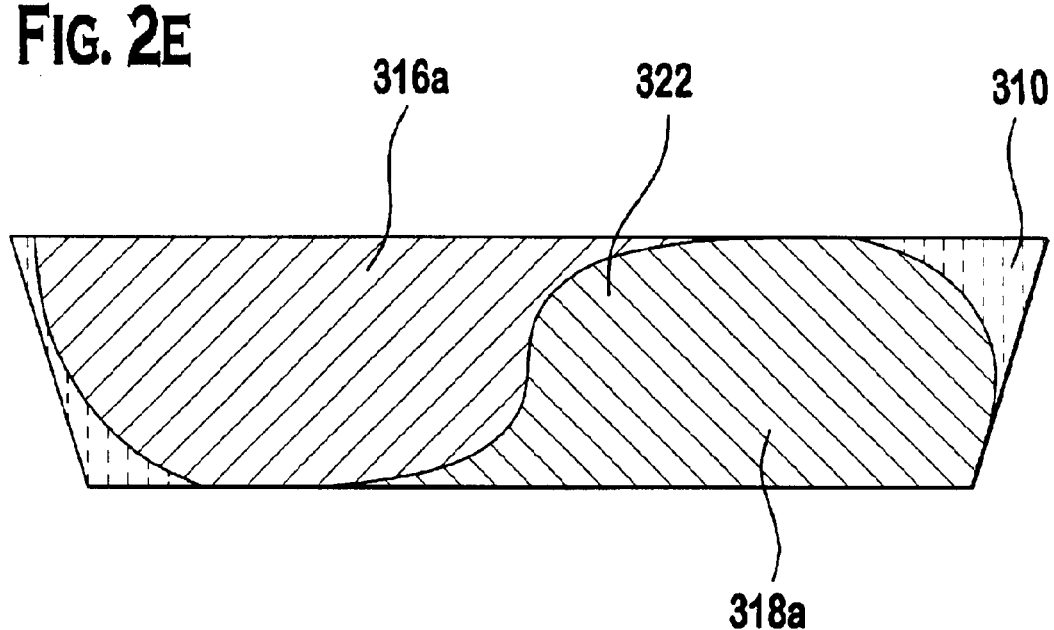

FIGS. 2a and 2b show respective side view of an orifice 12 of a workpiece 300 and the transformation of orifice 12 into an angled orifice 14. The orifice 12 is formed in the work piece 300, shown in FIG. 2a. The orifice 12 is defined by orifice surfaces 12a and 12b having generally uniform surface characteristics throughout. Subsequent to the formation of an angled orifice (angled with respect to the surface of the work piece 300) materials on the orifice surfaces 12a and 12b are removed and sheared away, leaving behind generally parallel ridges or region 310 uniformly distributed about the circumferential surface of the orifice 12, shown in FIG. 2b. As the orifice 14 is formed, in FIG. 2b, materials of the orifice surfaces are plastically deformed and cold worked (shown here as regions 310a and 310b) as the respective tool head cuts into the crystalline structure of the orifice surfaces of the orifice. Since the tool heads are moved (as will be described further on in this disclosure) in opposite directions with respect to the orifice 12, a transition region 320 is formed between a first area 318a bounded by partial sections of the plate surfaces 302a, 302b and line 316 and a second area 318a bounded by partial sections of surfaces 302a, 302b and line 318. The first bounded area 316 a has surface characteristics oriented in a first direction due to the movement of the first tool head, which causes a change in the crystalline structure of the material of the orifice. To better illustrate the characteristics of the angled orifice, the orifice is unrolled in FIGS. 2d and 2e. That is, FIGS. 2d and 2e illustrate a 360 degrees panoramic view of the surfaces of the orifice as viewed by an observer rotating about the longitudinal axis A—A within the orifice. As seen in the "virtual" unrolling of the orifice 14 in FIGS. 2d and 2e, the second bounded area 318a has surface characteristics oriented in a second direction different from the first direction due to the movement of the second tool head, which also causes a change in the crystalline structures of the orifice plate. It should be noted that the crystalline structures of the transition region could be different from the crystalline structures of the first and second bounded areas. Similarly, the crystalline structures of the first bounded area can be different from the second bounded area. Although the first and second bounded areas 316a, 318a are shown as being bounded by partial sections of the surfaces 302a, 302b and two lines 316 and 318, in certain cases, depending on the geometries of the cutting tool(s) and other dimensional parameters of the orifice, the line 316 can merge with line 318 so as to define a single continuous line 322 between the two contiguous first and second areas in place of the transition region 320, shown here in FIG. 2e.

FIGS. 3a–3c illustrate one technique of how the perpendicular orifice 12 in FIG. 2a can be transformed into an angled orifice 14 in FIG. 2b. In particular, this technique, with reference to FIGS. 3a–3c, illustrates a generally simultaneous formation of a right-angled orifice 12 to an angled orifice 14 for plate 10. FIGS. 2a–2c, on the other hand, illustrate another technique that allows sequential formation of a right-angled orifice 12 to an angled orifice 14 in the orifice plate. As used herein, the term "orifice" denotes an "opening" that extends between a first surface 10a to a second surface 10b of a member, which is preferably is a plate. The "opening" can be of a suitable cross-section, such as, for example, circular, oval, rectangular, square or polygonal. Preferably, the orifice has a circular opening with straight orifice surfaces 12a and 12b (of orifice 12) and an oval opening subsequent to the formation of angled orifice surfaces 14a and 14b (of orifice 14).

The orifice plate 10 can include a member of a suitable cross-section, such as, for example, a plate with a first surface 10a that can be linear and preferably parallel to a linear second surface 10b; a plate having non-parallel first surface 10a (which can be a substantially planar surface) to the second surface 10b (which can also be a substantially planar surface); or a plate with a first surface 10a that can be curvilinear and preferably parallel to a curvilinear second surface 10b. The orifice 10 can include a right-angled orifice 12 pre-formed thereon or the right-angled orifice 12 can be formed prior to the formation of the angled orifice 14. Preferably, the formations of the right-angled orifice can be done prior to the formation of an angled orifice. The right-angled orifice 12 can be formed by a suitable technique, such as, for example, electro-discharge-machining (EDM), laser drilling or by mechanical drilling/punching. The plate or metal sheet can be between approximately 0.003 –0.010 inch in thickness. The plate can be any suitable material, such as, for example, metal, composite, monomer or polymer that deforms upon application of a compressive load. Preferably, the orifice plate 10 can be a stainless steel plate or sheet having linearly parallel first and second surfaces 10a and 10b separated by a distance of approximately 0.006 inch, which plate also has an orifice 12 preformed by a suitable technique such as, for example, by mechanical drilling, punching, laser drilling or by Electric Discharge Machining.

With reference to FIGS. 3a–3c, a generally simultaneous operation that forms an angled orifice 14 is preferably shown. Specifically, an orifice plate 10 can be provided with a preformed orifice 12 of a first predetermined cross-sectional area $A_1$. The first cross-sectional area $A_1$ is referenced as an area generally transverse to the axis A on either surface 302a or 302b. A first punch tool 20a and a second punch tool 20b are placed on opposite sides of the plate 10 such that a longitudinal axis extending along each of the tool is substantially parallel to the longitudinal axis A. The first punch tool 20a can be provided with a first tip 22 having a suitable cross-section, such as, for example, a cone, a right triangle, square, polygonal or a wedge. The second punch tool 20b can be provided with a second tip 24 having a suitable cross-section, such as, for example, a cone, a right triangle, square, polygonal or a wedge. Preferably, the tips 22 and 24 are conic. Also desirably, the formation of the orifice 14 can be performed in sequence by the tool heads as a function of the speed of the press and size and progression of the die.

Each of the tips 22 and 24 can be aligned such that, as each tip is moved towards the orifice 12, the respective tip can be contiguous to a portion of the edge of the orifice 12 (FIGS. 3a and 4a). As each tip is further moved in a direction along the axis A (FIG. 3b), the orifice surfaces 12a and 12b are plastically deformed, resulting in a permanent deformation of the orifice surfaces 10a and 10b (FIGS. 2b and 3c). Although the wall surfaces have been described as separate portions, it should be understood that each surface is part of an area defining the orifice. Each of the orifice surfaces 12a and 12b can be deformed into respective orifice surfaces 14a and 14b that are oblique with respect to the longitudinal axis, or at least one orifice surface is oblique to both the axis A and the other orifice surface (FIG. 2b). Moreover, due to the punch tools, the walls surfaces 14a, 14b are deformed so as to define a second predetermined cross-sectional area $A_2$ (as referenced generally transverse to axis A) of the orifice 14 where $A_2 > A_1$ of the area of the orifice 12. Furthermore, some materials from the orifice surfaces 10a and 10b are removed while other materials of the orifice surfaces are plastically deformed.

To insure that an appropriate amount of force can be transmitted to one of the tips so that each tip can plastically deform the wall or orifice surfaces of the orifice 12, it is preferable to have at least one tip moving relative to the other tip along the longitudinal axis at substantially same time so that the force transmitted to one of the tip can be supported by the other tip.

The formation of an angled orifice can be done in sequence in another preferred embodiment, shown here in FIGS. 4a–4c. Here, an orifice plate 10 is again preferably provided with an orifice 12 having its surface extending along the axis A. One of the first and second surfaces 10a and 10b can be placed against a first die bushing 30a. The punch tool can be used to plastically deform the orifice surfaces 10a or 10b from the other of the first and second surfaces 10a, 10b (FIGS. 4a and 4b) by moving the punch tool along a first axis B that can be parallel and offset to the axis A. This results in an orifice plate 10 having a orifice surface 14a oriented in an oblique direction relative to the axis A. The plate 10 is then moved along a direction X. A second die bushing 30b can be placed against the other of the first and second surfaces 10a and 10b (i.e. surface 10a) while the second punch tool 20b can be moved along a second axis C parallel to and offset to axis A. This results in the orifice plate having an orifice surface 14b oriented in an oblique direction relative to the longitudinal axis A or to the orifice surface 14a.

In another preferred embodiment, illustrated in FIGS. 5a–5f, a first punch tool 200 can be used to punch a first surface 210a of a metal sheet 210, a first orifice 212 having orifice surfaces 212a and 212b perpendicular to one of the first and second substantially planar surfaces 210a and 210b of the metal sheet 210, which first punch tool can be used to deform the first surface 210a to a first oblique orifice surface 211a of the orifice and a second punch tool 202 can be used to deform the second orifice surfaces 210b to a second oblique orifice surface 211b. Specifically, the first punch tool 200 can be moved in a first axis A that can be perpendicular to one of the first and second surfaces 210a and 210b (FIG. 5a). As the first punch tool moves through the metal sheet 210, an orifice 212 having parallel orifice surfaces 212a and 212b are formed (FIG. 5b). The first punch tool is then withdrawn and is translated by a predetermined offset from the axis A, such that a tip 200a can be generally contiguous to one of edges 212c and 212d formed between the surfaces 210a, 210b and the orifice surfaces 212a and 212b (FIG. 5c).

The first punch tool 200 can be moved along a second axis B, which axis B is preferably parallel to the first axis A, and can be also perpendicular to one of the surfaces 210a and 210b so as to plastically deform the first orifice surface 212a to a first oblique orifice surface 213a (FIG. 5d). The second punch tool 202, which could be an identical punch tool to the first punch tool 200, can be aligned with a third axis C such that, preferably, a tip 202a, is contiguous with the edge 212d of the orifice 212. The third axis C can be preferably parallel to and offset by a predetermined distance from the first axis A. As the punch tool 202 is moved along the axis C, the tip 202a plastically deforms the orifice surface 212b of the orifice 212 so as to form a second oblique orifice surface 213b. The first oblique orifice surface 213a and the second oblique orifice surface 213b are preferably parallel to each other and oblique with respect to the first axis A. It should be noted here that, instead of a second punch tool, the workpiece could be flipped 180 degrees such that the first punch tool can be used to also punch surface 210b. It should also be noted here that an area that is formed by an opening of the oblique orifice 213 could be greater than an area that is formed by an opening of the orifice 212. Further details of the processes involved in forming the angled orifice is also provided in copending application Ser. No. 10/097,387 filed on even date as the instant application, which copending application is herein incorporated by reference in its entirety.

As used herein, the term plastic deformation indicates that a material 300 of the orifice plate 10, specifically the orifice 12, can be deformed beyond the elastic limit, thereby resulting in a permanent deformation of the material in a surrounding area 310 (FIGS. 1a–1c). The permanently deformed material may provide a characteristic bulged or raised portion 312 or 314 of plastically deformed material bulging away from the planar surface near respective intersections between the orifice and the surfaces 302a or 302b of the orifice 14 or 213. Additionally, due to slippage of crystalline structures prevalent in the preferred material (stainless steel) of the orifice plate, the surrounding area 310 of the orifice 14 or 212 can be hardened by cold-working. Cold-worked metal results in new dislocations being produced when the metal is deformed. As the number of dislocations in the crystal change, they should become tangled or pinned and would not be able to move. This should strengthen the material near or surrounding the orifice plate, which should make the plate as whole harder to deform due to the cold working process. For the angled orifice 14 or 213, compressive stresses are beneficial in increasing resistance to fatigue failures, corrosion fatigue, stress corrosion cracking, hydrogen assisted cracking, fretting, galling and erosion caused by fluid flow cavitation. The orifice 14 or 213 may also benefit due to work hardening, intergranular corrosion resistance, surface texturing and closing of porosity in the metal. Also, the cold working, or expansion, of the orifice 14 or 213 creates compressive stress zones around the orifice. These compressive stress zones around the orifice 14 or 213 should provide an increase in hardness and improved fatigue resistance of the material that the orifice is made of. It should be noted that, in a suitable application, the cold-worked metal plate or metal sheet used to form the orifice disc can also be heat treated by a suitable heat treatment such as, for example, annealing, process-annealing, normalizing, patenting, spherodizing, or tempering for one or more purposes such as (1) to remove stresses; (2) to induce softness; (3) to alter ductility, toughness, electrical, magnetic or other physical properties; (4) to refine the crystalline structure; (5) to remove gases; or (6) to produce a desired micro-structure for the sheet metal or plate.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A fuel injector having a housing extending a longitudinal axis, the housing including an inlet, an outlet and a passageway disposed between the inlet and the outlet, the fuel injector comprising:

an electromagnetic actuator proximate the inlet, the electromagnetic actuator including an armature and an electromagnetic coil;

a closure member operable via the electro actuator to occlude fuel flow to the outlet in a first position and operable to permit fuel flow to the outlet in a second position; and an orifice plate proximate the outlet, the orifice plate having first and second plate surfaces spaced at a predetermined distance from one another along a longitudinal axis, the predetermined distance comprises a distance between approximately 0.001 and 0.010 inch, and an orifice extending between the surfaces, the orifice including a first orifice surface and a second orifice surface being spaced from the first orifice surface, the first orifice surface having a first region including a first surface characteristic being oriented in a first direction oblique to the longitudinal axis, the second orifice surface having a second region having second surface characteristic being oriented in a second direction oblique to longitudinal axis.

2. The fuel injector according to claim 1, wherein the predetermined distance comprises approximately 0.006 inch.

3. The fuel injector according to claim 1, wherein the first region is contiguous to the second region such that a continuous transition line separates the first region from the second region.

4. The fuel injector according to claim 3, wherein the transition line defines a transition region, the transition region, the first region and the second region each comprises crystalline structures, the crystalline structure of the transition region being different from the crystalline structures of the first region and the second region.

5. The fuel injector according to claim 4, wherein an intersection of one of the first and second plate surfaces with one of the first and second orifice surfaces proximate at least one of the first and second regions includes at least a raised portion.

6. The fuel injector according to claim 1, wherein the first region is spaced from the second region by a transition region.

7. The fuel injector according to claim 6, wherein the transition region, first region and second region each comprises a crystalline structure, the crystalline structure of the transition region being different from the crystalline structure of the first region and the crystalline structure of the second region.

8. The fuel injector according to claim 7, wherein an intersection of one of the first and second plate surfaces with one of the first and second orifice surfaces proximate at least one of the first and second regions includes at least a raised portion.

9. The fuel injector according to claim 1, wherein the first characteristic comprises plastically deformed material of the orifice being oriented in the first direction.

10. The fuel injector according to claim 1, wherein the second characteristic comprises plastically deformed material of the orifice being oriented in a second direction.

11. A fuel injector having a housing extending a longitudinal axis, the housing including an inlet, an outlet and a passageway disposed between the inlet and the outlet, the fuel injector comprising:
   an electromagnetic actuator proximate the inlet, the electromagnetic actuator including an armature and an electromagnetic coil;
   a closure member operable via the electro actuator to occlude fuel flow to the outlet in a first position and operable to permit fuel flow to the outlet in a second position;
   an orifice plate proximate the outlet, the orifice plate having first and second plate surfaces spaced at a predetermined distance from one another along a longitudinal axis and an orifice extending between the surfaces, the orifice including a first orifice surface and a second orifice surface being spaced from the first orifice surface, the first orifice surface having a first region including a first surface characteristic being oriented in a first direction oblique to the longitudinal axis, the second orifice surface having a second region having second surface characteristic being oriented in a second direction oblique to longitudinal axis; and
   an intersection of one of the first and second plate surfaces with one of the first and second orifice surfaces proximate at least one of the first and second regions, the intersection including at least a raised portion.

12. The fuel injector according to claim 11, wherein the first region includes a crystalline structure different from a crystalline structure of the second region.

13. The fuel injector according to claim 12, wherein the first direction is generally opposite the second direction.

14. The fuel injector according to claim 12, wherein the first direction is generally oblique to the second direction.

15. A valve assembly for controlling fluid flow, the valve assembly comprising:
   a body having a first end and a second end;
   an actuator operable within the body;
   a closure member operable by the actuator to occlude fluid flow in one position and operable to permit flow in another position;
   a surface contiguous to the closure member in the one position so as to form a sealing surface; and
   an orifice plate proximate one of the first and second ends, the orifice plate including:
      first and second plate surfaces spaced at a predetermined distance from one another along a longitudinal axis, the predetermined distance comprises a distance between approximately 0.001 and 0.010 inch; and
      an orifice extending between the first plate surface and second plate surface, the orifice including a first orifice surface and a second orifice surface being spaced from the first orifice surface, the first orifice surface having a first region including a first surface characteristic being oriented in a first direction oblique to the longitudinal axis, the second orifice surface having a second region including a second surface characteristic being oriented in a second direction oblique to the longitudinal axis.

16. The valve assembly according to claim 15, wherein the predetermined distance comprises approximately 0.006 inch.

17. The valve assembly according to claim 15, wherein the first region is contiguous to the second region such that a continuous transition line separates the first region from the second region.

18. The valve assembly according to claim 17, wherein the transition line, the first region and the second region each comprises a crystalline structure, the crystalline structure of the transition line being different from the crystalline structure of the first region and the crystalline structure of the second region.

19. The valve assembly according to claim 15, wherein the first region is spaced from the second region by a transition region.

20. The valve assembly according to claim 19, wherein the transition region, the first region and the second region each comprises a crystalline structure, the crystalline structure of the transition region being different from a the crystalline structure of the first region and the crystalline structure of the second region.

21. The valve assembly according to claim 15, wherein the first region includes a crystalline structure and the second region includes a crystalline structure, the crystalline structure of the first region being different from the crystalline structure of the second region.

22. The valve assembly according to claim 21, wherein an intersection of one of the first and second plate surfaces with one of the first and second orifice surfaces proximate at least one of the first and second regions includes at least a raised portion.

23. The valve assembly according to claim 15, wherein the first direction is generally opposite the second direction.

24. The valve assembly according to claim 15, wherein the first direction is generally oblique to the second direction.

25. A valve assembly for controlling fluid flow, the valve assembly comprising:
   a body having a first end and a second end;
   an actuator operable within the body;
   a closure member operable by the actuator to occlude fluid flow in one position and operable to permit flow in another position;
   a surface contiguous to the closure member in the one position so as to form a sealing surface; and
   an orifice plate proximate one of the first and second ends, the orifice plate including:
      first and second plate surfaces spaced at a predetermined distance from one another along a longitudinal axis;
      an orifice extending between the first plate surface and second plate surface, the orifice including a first orifice surface and a second orifice surface being spaced from the first orifice surface, the first orifice surface having a first region including a first surface characteristic being oriented in a first direction oblique to the longitudinal axis, the second orifice surface having a second region including a second surface characteristic being oriented in a second direction oblique to the longitudinal axis; and
      an intersection of one of the first and second plate surfaces with one of the first and second orifice surfaces proximate at least one of the first and second regions, the intersection including at least a raised portion.

26. A valve assembly for controlling fluid flow, the valve assembly comprising:
   a body having a first end and a second end;
   an actuator operable within the body;
   a closure member operable by the actuator to occlude fluid flow in one position and operable to permit flow in another position;
   a surface contiguous to the closure member in the one position so as to form a sealing surface; and
   an orifice plate proximate one of the first and second ends, the orifice plate including:
      first and second plate surfaces spaced at a predetermined distance from one another along a longitudinal axis;
      an orifice extending between the first plate surface and second plate surface, the orifice including a first orifice surface and a second orifice surface being spaced from the first orifice surface, the first orifice surface having a first region including a first surface characteristic being oriented in a first direction oblique to the longitudinal axis, the second orifice surface having a second region including a second surface characteristic being oriented in a second direction oblique to the longitudinal axis, the first region being spaced from the second region by a transition region; and
      an intersection of one of the first and second plate surfaces with one of the first and second orifice surfaces proximate at least one of the first and second regions, the intersection including at least a raised portion.

27. A fuel injector having a housing extending a longitudinal axis, the housing including an inlet, an outlet and a passageway disposed between the inlet and the outlet, the fuel injector comprising:
   an electromagnetic actuator proximate the inlet, the electromagnetic actuator including an armature and an electromagnetic coil;
   a closure member operable via the electro actuator to occlude fuel flow to the outlet in a first position and operable to permit fuel flow to the outlet in a second position; and
   an orifice plate proximate the outlet, the orifice plate having first and second plate surfaces spaced at a predetermined distance from one another along a longitudinal axis and an orifice extending between the surfaces, the orifice including a first orifice surface and a second orifice surface being spaced from the first orifice surface, the first orifice surface having a first region including a first surface characteristic being oriented in a first direction oblique to the longitudinal axis, the second orifice surface having a second region having second surface characteristic being oriented in a second direction oblique to longitudinal axis, the first characteristic including plastically deformed material of the orifice being oriented in the first direction.

28. The fuel injector according to claim 27, wherein the second characteristic comprises plastically deformed material of the orifice being oriented in a second direction.

29. The fuel injector according to claim 27, wherein the predetermined distance comprises a distance between approximately 0.001 and 0.010 inches.

30. The fuel injector according to claim 29, wherein the predetermined distance comprises approximately 0.006 inch.

31. The fuel injector according to claim 27, wherein the first region is contiguous to the second region such that a continuous transition line separates the first region from the second region.

32. The fuel injector according to claim 31, wherein the transition line defines a transition region, the transition region, the first region and the second region each comprises crystalline structures, the crystalline structure of the transition region being different from the crystalline structures of the first region and the second region.

33. The fuel injector according to claim 32, wherein an intersection of one of the first and second plate surfaces with one of the first and second orifice surfaces proximate at least one of the first and second regions includes at least a raised portion.

34. The fuel injector according to claim 27, wherein the first region is spaced from the second region by a transition region.

35. The fuel injector according to claim 34, wherein the transition region, first region and second region each comprises a crystalline structure, the crystalline structure of the transition region being different from the crystalline structure of the first region and the crystalline structure of the second region.

36. The fuel injector according to claim 35, wherein an intersection of one of the first and second plate surfaces with one of the first and second orifice surfaces proximate at least one of the first and second regions includes at least a raised portion.

37. The fuel injector according to claim 35, wherein an intersection of one of the first and second plate surfaces with one of the first and second orifice surfaces proximate at least one of the first and second regions includes at least a raised portion.

38. A fuel injector having a housing extending a longitudinal axis, the housing including an inlet, an outlet and a passageway disposed between the inlet and the outlet, the fuel injector comprising:
   an electromagnetic actuator proximate the inlet, the electromagnetic actuator including an armature and an electromagnetic coil;
   a closure member operable via the electro actuator to occlude fuel flow to the outlet in a first position and operable to permit fuel flow to the outlet in a second position; and
   an orifice plate proximate the outlet, the orifice plate having first and second plate surfaces spaced at a predetermined distance from one another along a longitudinal axis and an orifice extending between the surfaces, the orifice including a first orifice surface and a second orifice surface being spaced from the first orifice surface, the first orifice surface having a first region including a first surface characteristic being oriented in a first direction oblique to the longitudinal axis, the second orifice surface having a second region having second surface characteristic being oriented in a second direction oblique to longitudinal axis, the first region contiguous to the second region such that a continuous transition portion separates the first region from the second region.

39. The fuel injector of claim 38, wherein the first characteristic comprises a plastically deformed material of the orifice being oriented in the first direction.

40. The fuel injector according to claim 39, wherein the second characteristic comprises a plastically deformed material of the orifice being oriented in a second direction.

41. The fuel injector according to claim 38, wherein the predetermined distance comprises a distance between approximately 0.001 and 0.010 inches.

42. The fuel injector according to claim 41, wherein the predetermined distance comprises approximately 0.006 inch.

43. The fuel injector according to claim 42, wherein the transition line defines a transition region, the transition region, the first region and the second region each comprises crystalline structures, the crystalline structure of the transition region being different from the crystalline structures of the first region and the second region.

44. The fuel injector according to claim 43, wherein an intersection of one of the first and second plate surfaces with one of the first and second orifice surfaces proximate at least one of the first and second regions includes at least a raised portion.

45. The fuel injector according to claim 38, wherein the first region is spaced from the second region by a transition region.

* * * * *